United States Patent
Jones et al.

(10) Patent No.: US 7,147,884 B2
(45) Date of Patent: Dec. 12, 2006

(54) METHOD FOR MAKING A NOVELTY FROZEN FOOD PRODUCT

(76) Inventors: Curt D. Jones, 1090 Laurel Knoll Ct., Brentwood, TN (US) 37027; Stan Jones, 2655 Old Metropolis Rd., Vienna, IL (US) 62995

( * ) Notice: Subject to any disclaimer, the term of this patent is extended or adjusted under 35 U.S.C. 154(b) by 139 days.

(21) Appl. No.: 10/326,253

(22) Filed: Dec. 19, 2002

(65) Prior Publication Data

US 2004/0247747 A1    Dec. 9, 2004

Related U.S. Application Data

(60) Provisional application No. 60/344,006, filed on Dec. 27, 2001.

(51) Int. Cl.
*A23G 9/04* (2006.01)

(52) U.S. Cl. ..................... 426/565; 426/101

(58) Field of Classification Search ........ 426/565–567, 426/100, 101, 89, 95, 249, 389, 512, 524
See application file for complete search history.

(56) References Cited

U.S. PATENT DOCUMENTS

| | | | | |
|---|---|---|---|---|
| 2,893,605 | A | * | 7/1959 | Anderson ................ 222/145.3 |
| 3,360,384 | A | * | 12/1967 | Kurzinski et al. .......... 426/531 |
| 3,647,478 | A | * | 3/1972 | Minor et al. ................ 426/249 |
| 4,031,262 | A | * | 6/1977 | Nakayama et al. ......... 426/565 |
| 4,310,559 | A | * | 1/1982 | Mita et al. .................. 426/101 |
| 4,353,927 | A | * | 10/1982 | Lovercheck ................ 426/101 |
| 4,643,905 | A | * | 2/1987 | Getman ...................... 426/565 |
| 4,881,663 | A | | 11/1989 | Seymour |
| 5,126,156 | A | * | 6/1992 | Jones ......................... 426/418 |
| 5,219,455 | A | | 6/1993 | Trucco ....................... 417/307 |
| 5,232,027 | A | | 8/1993 | Tanaka et al. .............. 141/270 |
| 5,378,483 | A | * | 1/1995 | Fazio et al. ................. 426/282 |
| 5,403,611 | A | | 4/1995 | Tomita et al. .............. 426/565 |
| 5,464,119 | A | | 11/1995 | Giuseppe et al. ........... 221/156 |
| 5,620,732 | A | | 4/1997 | Clemmings et al. ........ 426/565 |
| 5,714,043 | A | | 2/1998 | Finley et al. |

(Continued)

OTHER PUBLICATIONS

The American Heritage® Dictionary of the English Language, Fourth Edition☐☐Copyright © 2000 by Houghton Mifflin Company.*

*Primary Examiner*—Arthur L. Corbin
(74) *Attorney, Agent, or Firm*—Stockwell & Smedley, PSC

(57) ABSTRACT

A novel frozen product and method for making the same are disclosed, wherein a beaded frozen product is intermixed with conventional ice cream. In this regard, the beaded ice cream (or other frozen produce) may be intermixed with soft-serve ice cream on an individual serving basis, or may be intermixed with ice cream manufactured on a large scale production (e.g., packaged with ice cream conventionally sold in grocery stores). With regard to individual servings, beads of ice cream may be injected at a dispensing nozzle of machine for dispensing soft-serve ice cream. Alternatively, the beaded ice cream may be introduced into a reservoir of soft-serve ice cream and intermixed through a stirring or agitation process. With regard to packaged ice cream, such as that purchased in grocery stores, beaded ice cream may be introduced into a conventional ice cream mix at a stage in the process where the non-beaded ice cream is still flowable such that the beaded ice cream may be stirred or agitated to mix and disperse relatively evenly throughout the ice-cream product. Upon final freezing, the beads of ice cream, which retain their beaded form, will be intermixed and suspended throughout the ice-cream product.

6 Claims, 8 Drawing Sheets

U.S. PATENT DOCUMENTS

| | | |
|---|---|---|
| 5,813,242 A | 9/1998 | Lawrence et al. |
| 5,948,456 A * | 9/1999 | Jones et al. .................. 426/100 |
| 5,958,493 A | 9/1999 | Grigoli ........................ 426/421 |
| 6,060,099 A | 5/2000 | Ito ............................... 426/243 |
| 6,089,747 A | 7/2000 | Huang ......................... 366/149 |
| 6,103,287 A | 8/2000 | Soehnlen et al. ............ 426/393 |
| 6,145,701 A | 11/2000 | Van Der Merwe et al. ... 222/40 |
| 6,174,550 B1 | 1/2001 | Fletcher et al. |
| 6,209,590 B1 | 4/2001 | Mandsberg ..................... 141/1 |
| 6,250,794 B1 | 6/2001 | Huang ......................... 366/149 |
| 6,267,049 B1 | 7/2001 | Silvano ........................ 99/455 |
| 6,318,889 B1 | 11/2001 | Hansen, Sr. ................. 366/286 |
| 6,355,290 B1 | 3/2002 | Soehnlen et al. ........... 426/393 |
| 6,539,743 B1 | 4/2003 | Jones |
| 2002/0129616 A1 | 9/2002 | Jones |

* cited by examiner

METHOD FOR MAKING A NOVELTY FROZEN FOOD PRODUCT

CROSS-REFERENCE TO RELATED APPLICATION

This application claims the benefit of U.S. provisional application Ser. No. 60/344,006, filed Dec. 27, 2001, which is hereby incorporated by reference.

FIELD OF THE INVENTION

The present invention relates generally to ice-cream products and their methods of preparation, and more particularly to a novelty frozen products product.

DESCRIPTION OF THE PRIOR ART

Sales of ice cream and frozen yogurt products have risen dramatically in recent years, and applicants herein have captured a portion of this product market through the development of a unique novelty ice cream, frozen yogurt and ice product in the form of beads. This product, marketed under the trademarks "Dippin' Dots®" and "Ice Cream of the Future®", has become very popular in specialty stores, at fairs and theme parks, and through vending machines.

Applicants have proprietary rights in the method of preparing and storing the product pursuant to U.S. Pat. No. 5,126,156, issued Jun. 30, 1992, herein incorporated by reference, as well as rights associated with improvements pursuant to U.S. Pat. No. 5,664,422, issued Sep. 9, 1997, and U.S. Pat. No. 6,000,229, issued Dec. 14, 1999, herein incorporated by reference. As is generally described therein, the patented method involves delivering flavored liquid dairy and other alimentary compositions to a feed tray and then dripping the composition into a freezing chamber. The feed tray comprises a plurality of orifices through which liquid composition passes to fall into the freezing chamber, either in the form of droplets or liquid streams, which streams break into droplets before freezing. Each orifice may also have a corresponding feed dropper, which is downwardly disposed in relation to the tray such that the liquid composition passes from the tray through an orifice and then through an associated feed dropper where a droplet or liquid stream is formed. The orifices or combination of orifices and feed droppers will hereinafter be referred to collectively as feed assemblies.

The falling droplets of liquid composition freeze rapidly (i.e., flash freeze) in the freezing chamber due to the presence of both gaseous and liquid refrigerant in the area between the orifices and the bottom of the freezing chamber, thereby forming solid beads of flavored ice cream, yogurt or other alimentary products, such as flavored ice. More specifically, as droplets of liquid free fall through a gaseous region of the freezing chamber, and before the droplets contact the liquid refrigerant, the outer spheres of the droplets form a thin frozen shell. This thin frozen shell serves to protect the spherical shape of the droplets as they impact the surface of the liquid refrigerant. The remainder of the droplets freezes completely as they pass through the liquid refrigerant, and before reaching the bottom of the freezing chamber. The frozen beads are removed from the freezing chamber and packed for distribution and later consumption.

While the free-flowing, beaded ice cream that is prepared through the above-described flash-freezing process has enjoyed wide-spread popularity and success, it is believed that other unique novelty ice-cream products may enjoy similar demand and success.

BRIEF DESCRIPTION OF THE DRAWINGS

The accompanying drawings incorporated in and forming a part of the specification illustrate several aspects of the present invention, and together with the description serve to explain the principles of the invention. The components in the drawings are not necessarily to scale, emphasis instead being placed upon clearly illustrating the principles of the present invention. Moreover, in the drawings, like reference numerals designate corresponding parts throughout the several views. In the drawings.

SUMMARY OF THE INVENTION

Figure 1:
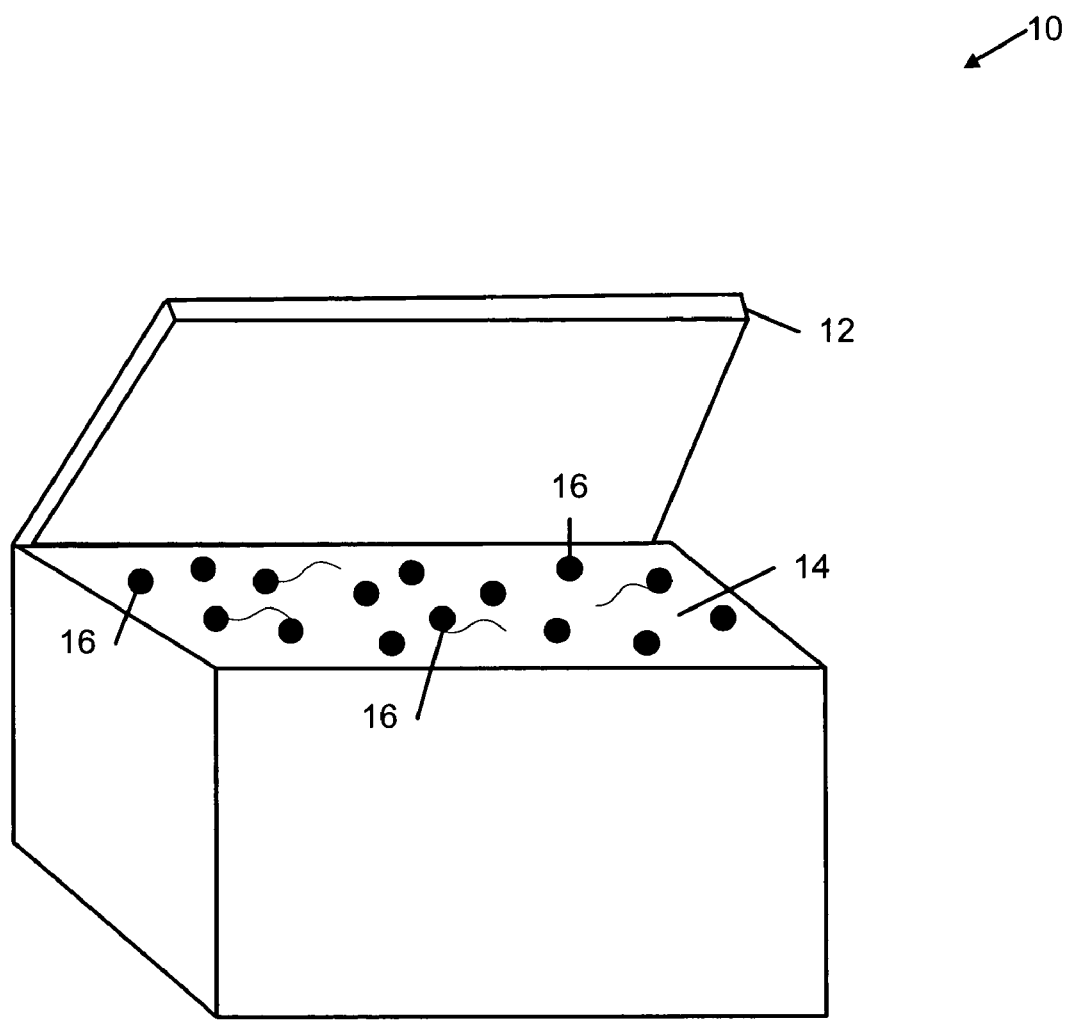
FIG. 1 is a perspective view of an ice-cream product in accordance with one embodiment of the invention.

The present invention is directed to a novel frozen product and method for making the same, wherein a beaded frozen product is intermixed with conventional ice cream. In this regard, the beaded ice cream may be intermixed with soft-serve ice cream on an individual serving basis, or may be intermixed with ice cream manufactured on a large scale production (e.g., packaged with ice cream conventionally sold in grocery stores). With regard to individual servings, beads of ice cream may be injected at a dispensing nozzle of machine for dispensing soft-serve ice cream. Alternatively, the beaded ice cream may be introduced into a reservoir of soft-serve ice cream and intermixed through a stirring or agitation process. With regard to packaged ice cream, such as that purchased in grocery stores, beaded ice cream may be introduced into a conventional ice cream mix at a stage in the process where the non-beaded ice cream is still flowable such that the beaded ice cream may be stirred or agitated to mix and disperse relatively evenly throughout the ice-cream product. Upon final freezing, the beads of ice cream, which retain their beaded form, will be intermixed and suspended throughout the ice-cream product.

DETAILED DESCRIPTION

Having summarized various aspects of the preferred embodiment, reference will now be made in detail to the description of the invention as illustrated in the drawings.

While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Reference is made to FIG. 1, which illustrates an ice-cream product 10 constructed in accordance with the present invention. Specifically, the product illustrated in FIG. 1 shows an ice-cream product such as that conventionally bought in a grocery store. The product shows a container 12 containing ice-cream product 14 having beads 16 of another frozen product interspersed throughout. The beaded frozen product may any of a variety of products, including be ice cream, yogurt, flavored ice, sherbet, etc.

The product may be packaged in a half-gallon or larger container to provide multiple servings. As illustrated, the ice cream may have a conventional texture, with a frozen beaded product intermixed throughout the frozen ice-cream product. In this regard, the beaded ice cream may be a flash-frozen product that is preferably manufactured in accordance with the teachings of U.S. Pat. No. 5,126,156, U.S. Pat. No. 5,664,422, U.S. Pat. No. 6,000,229, or similar process. In accordance with the present invention, this beaded product may be evenly intermixed throughout an otherwise convention ice-cream product.

As is known, and disclosed in the above-cited patents, the flash-frozen, beaded product, in order to maintain a free-flowing consistency to the beaded product, it is preferably stored at temperatures well below zero F. It has been found that higher storage temperatures result in fusion of the beads, and thereby loss of its free-flowing consistency. For these reasons, ice cream made in accordance with the above-cited patents is generally not sold in grocery stores due to the inability of the conventional freezers to maintain sufficiently low temperatures.

However, it has been discovered that if the beaded product is solidified or frozen within a conventional ice-cream product, that it need not be stored at such low temperatures, because the resulting product need not maintain a free-flowing consistency. What is important, however, for purposes of the preferred embodiment, is that the beaded ice-cream product be introduced into the conventional ice-cream product at a point in the processing where the beaded product may be uniformly mixed throughout the remaining ice-cream product. However, the beaded product will not be introduced too early in the processing or manufacturing stage such that the beaded product would melt and lose the consistency of the identifiable beads. As illustrated in FIG. 1, the final product illustrates a desired consistency of the final product.

One such method of producing a conventional ice cream containing a non-conventional beaded product would be to use a mechanism similar to a fruit and nut feeder (i.e., a mechanism used to mix fragments of fruit and/or nuts into ice-cream products), which delivers product into the freezer barrel of a continuous conventional barrel freezer. The introduction of the cryogenic beads at −150 degrees F. into the conventionally frozen product in the barrel freezer (typically at approximately 28 degrees F.) causes the 28 degree F. ice cream to freeze faster, thereby reducing the size of the ice crystals and increasing the quality of the ice cream that was combined with the beaded product. U.S. Pat. No. 6,103,287 discloses a system and process which may be utilized to introduce the beaded product into an otherwise conventional ice cream, in accordance with one embodiment of the invention. The contents of this patent are incorporated herein by reference.

Figure 2:
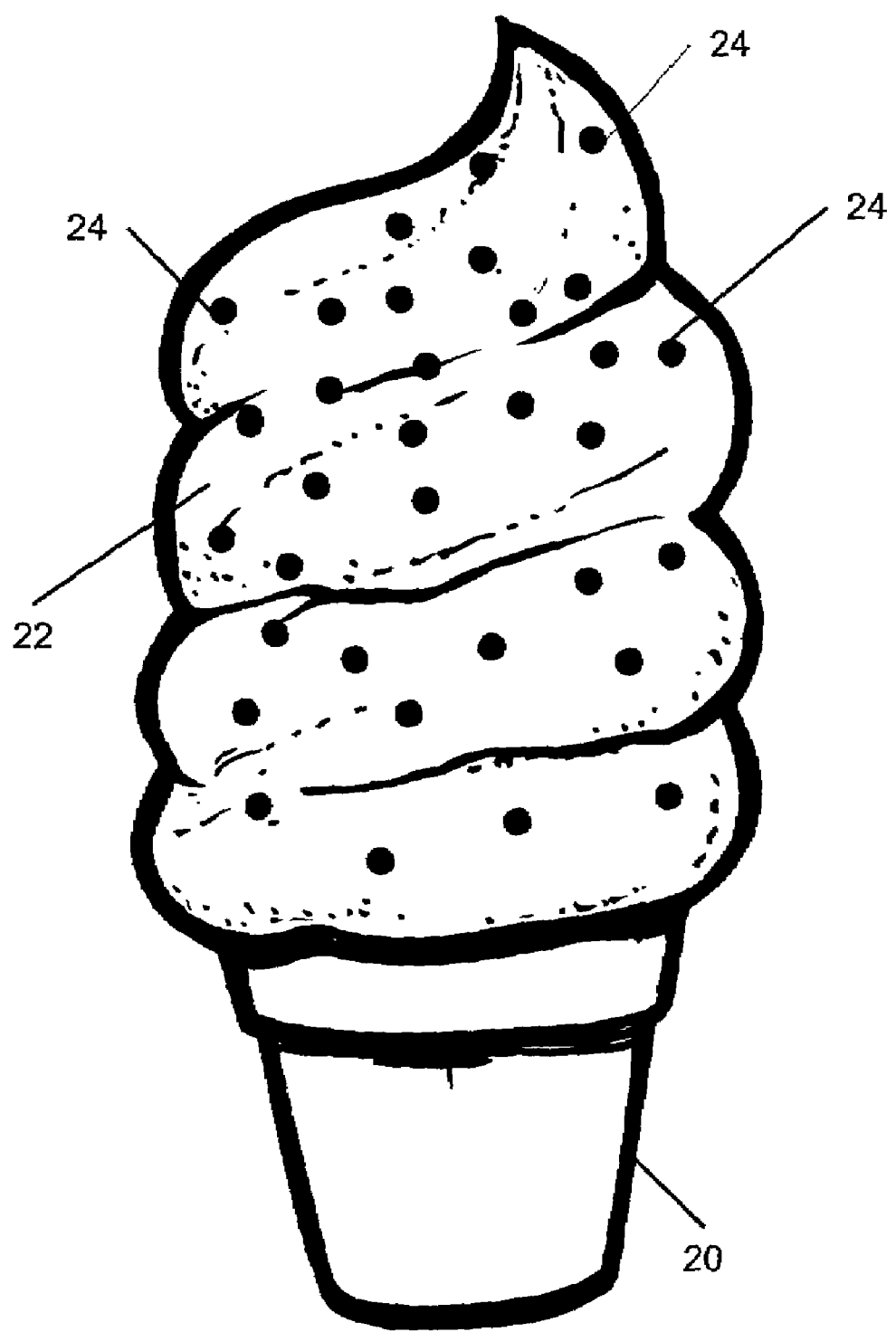
FIG. 2 is side view of an ice cream cone containing soft-serve ice cream in accordance with one embodiment of the invention.

Reference is made briefly to FIG. 2, which illustrates a similar product that may be distributed in a soft-serve form. The drawing of FIG. 2 shows an ice cream cone 20 having soft-serve ice cream 22 thereon. As illustrated, the product includes a soft-serve ice cream 22 that has a novelty beaded 24 frozen product distributed throughout.

With regard to soft-serve ice cream, a variety of apparatus and dispensing machinery is known for dispensing individual servings of ice cream. U.S. Pat. No. 6,250,794 and U.S. Pat. No. 6,318,889 illustrate two such apparatus (both of which are incorporated herein by reference). In general, the apparatus for dispensing soft-serve ice cream includes a reservoir for containing relative large quantities of the ice-cream product. A delivery mechanism, such as an auger or screw-type conveyor may be provided for directing ice cream from the reservoir to a dispensing tap where it may be controllably dispensed in single serving quantities. One method for creating the product illustrated in FIG. 2 would be to provide a unique injection nozzle 42 (or inlet channel) in conjunction with the auger delivery mechanism 44 for injecting beaded frozen product 60 into the soft-serve ice cream at or near the point of dispensing. Of course, in this embodiment, a separate reservoir (not shown) for retaining or holding the beaded ice-cream product may be provided. Furthermore, the separate reservoir will preferably be maintained at a sufficiently low temperature to preserve the free-flowing, beaded configuration of the product, so that it may be readily injected in the soft-serve ice-cream product.

Alternatively, the beaded product 60 may be introduced into the injection nozzle 42 by spooning, pouring, or using another similar approach. In this regard, the beaded product 60 may be stored separately in a freezer that is configured to maintain a sufficiently cold temperature, so as to preserve the free-flowing characteristic of the product (i.e., to avoid beads fusing together). This supply of beaded product 60 may be accessed by a dispensing person to scoop, spoon, or otherwise retrieve relatively small amounts of the product to introduce into the injection nozzle 42. Soft-serve ice cream is introduced into the dispensing portion of the apparatus and is delivered to an outlet through the action of the auger delivery mechanism 44. Beaded product introduced into the injection nozzle may be interspersed throughout the dispensed product through the agitating action of the auger delivery mechanism 44.

Figure 3:
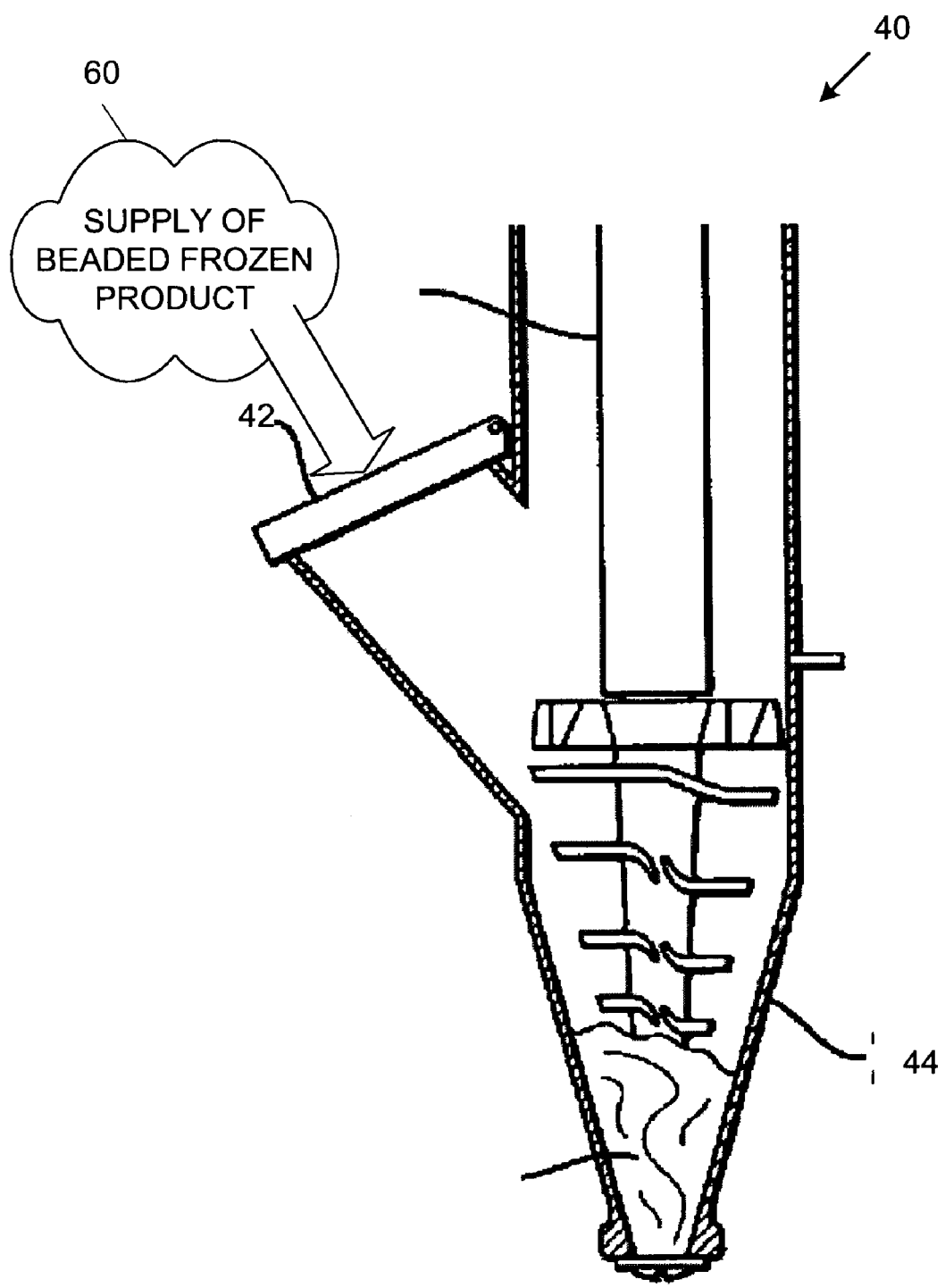
FIG. 3 is a diagram of a dispensing portion of a soft-serve ice cream dispensing apparatus in accordance with one embodiment of the invention.

As illustrated in FIG. 3, a dispensing portion of the apparatus 40 is shown for dispensing soft-serve ice cream. The apparatus 40 includes a reservoir (not shown) for containing soft-serve (or flowable) ice-cream product. The apparatus 40 also includes a delivery mechanism, such as an auger delivery mechanism 44 for dispensing the soft-serve product. As is known, this delivery system may be activated by the pull of a lever (not shown). Other features of the apparatus 40, as well as alternative apparatus configurations, will be appreciated by persons skilled in the art, and need not be further described herein.

In accordance with the invention, a separate reservoir or freezer compartment 60 may be provided for storing frozen beaded product to be mixed with the soft-serve ice-cream product to be dispensed from apparatus 40. Preferably, the freezer compartment 60 will be maintained at a sufficiently low temperature as to preserve the free-flowing granularity of the beaded frozen product. A second delivery system (not specifically illustrated) may be provided to channel and introduce the beaded frozen produce into the delivery channel of the apparatus 40, such that the beaded frozen product is introduced into the soft-serve product at or near the point of dispensing.

Figure 4:
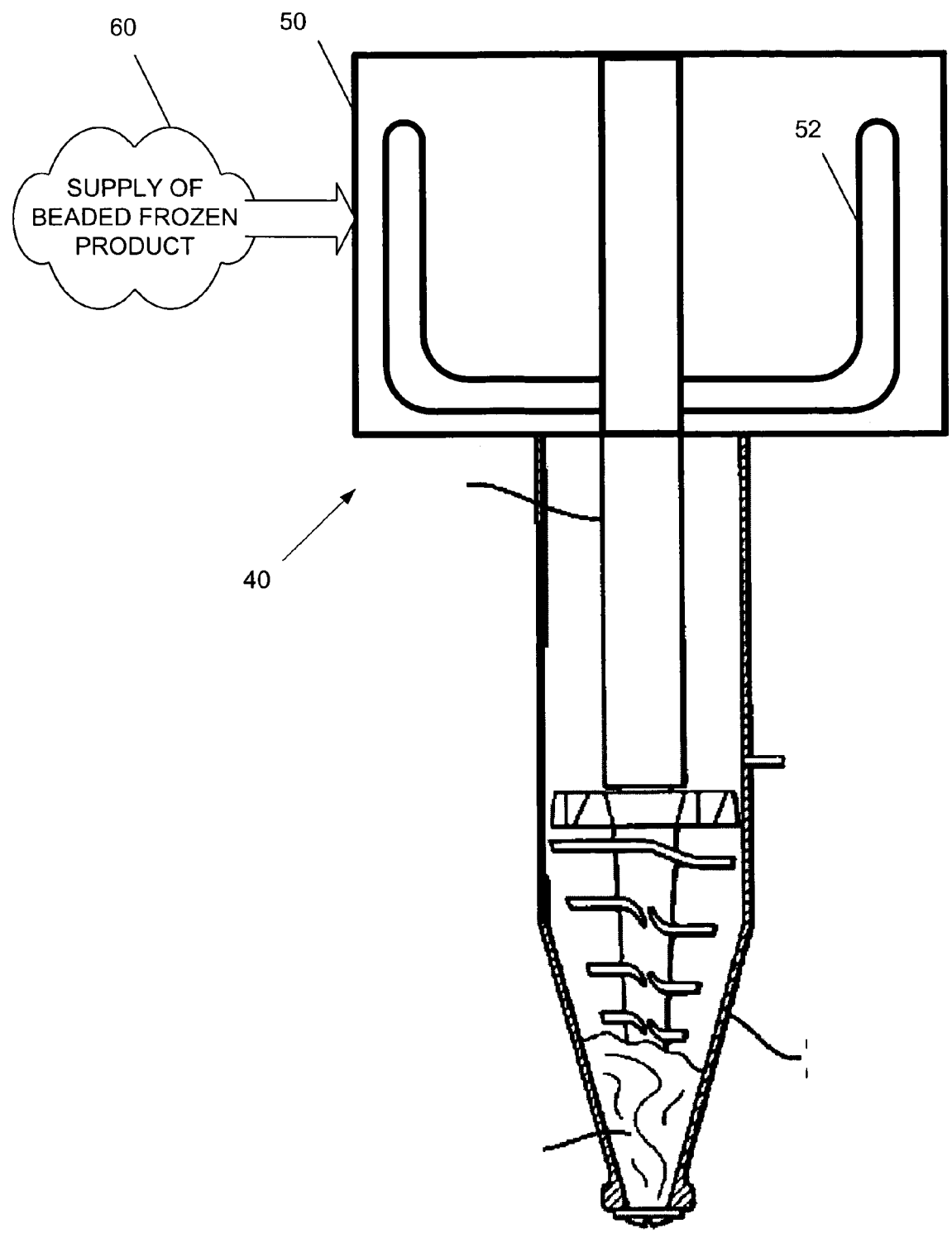
FIG. 4 is a diagram of a dispensing portion of a soft-serve ice cream dispensing apparatus in accordance with another embodiment of the invention.

In an alternative approach, one or more nozzles may be provided for injecting beaded ice cream into the reservoir of soft-serve ice cream. If a stirring mechanism, agitator, or other device is provided for periodically or continually mixing the soft-serve ice-cream product within the reservoir, such a mechanism may be effective for intermixing the beaded ice-cream product throughout. Such an alternative embodiment is illustrated in FIG. 4. Of course, depending upon the particular apparatus or machinery, other ways may be readily recognized for introducing and mixing the novel beaded ice-cream product throughout soft-serve ice cream.

As illustrated in FIG. 4, a dispensing nozzle somewhat similar to the nozzle of FIG. 3 may be provided for dispensing a soft-serve ice-cream product. However, rather than have the injection nozzle 42 for introducing the beaded product into the ice cream, the beaded product is, instead, introduced into a reservoir 50. Preferably, the reservoir includes a rotating blade (or paddle) 52, which is rotated to continually mix product within the reservoir. As small amounts of the beaded product are introduced into the reservoir 50, they are mixed with the soft-serve ice cream, so that the final ice-cream product contains a relatively uniform distribution of the frozen beads. Of course, consistent with the scope and spirit of the invention, a variety of different mechanisms may be used to mix the product within the reservoir.

In connection with a conventional, larger scale ice cream manufacturing process, the introduction of the beaded ice cream into the conventional ice-cream product is desired. Conventionally, ice cream is manufactured by mixing liquid ingredients in a mixing tank and feeding the mixed ingredients into a cooling unit where the mixed ingredients are reduced in temperature to about 20 degrees F. The mixed ingredients become significantly more viscous but will still flow. If the flavor being manufactured includes solid items, these solid items, such as cookie parts, are mixed into the flowing material at this point. This chilled and fully mixed material is fed to a package filling machine which feeds the material into the ice cream package. The ice cream package is closed and shrink wrapped to other packages for more convenient handling. The packaged ice cream is then placed in a hardening area for several hours where its temperature is reduced to zero or below for hardening. The packaged, finished ice cream is ready to be stored or shipped.

Indeed, a variety of methods, processes, and apparatus are known for manufacturing ice cream. U.S. Pat. No. 6,103,287, which is hereby incorporated by reference, discloses one such system and process. Consistent with the present invention, processes and apparatus such as the one described in U.S. Pat. No. 6,103,287 may be used, or other processes and apparatus may be used.

In one embodiment, conventional ice-cream product is introduced into its shipping container in a semi-frozen state (e.g., in a soft or flowable form) and the container is introduced into a freezing chamber where it is frozen into a solid form for shipping and distribution. The beaded frozen product is introduced into the semi-frozen ice-cream product at or near the time the product is introduced into the shipping container. The beaded product may be stirred or otherwise mixed into the semi-frozen product to achieve a reasonably uniform distribution throughout. As the filled containers later freeze solid, the product configuration illustrated in FIG. 1. It should be appreciated that, by introducing the beaded ice-cream product into the conventional ice-cream product, after the conventional ice-cream product has been formed into a semi-frozen state, the temperature of the resulting product should be sufficiently low that the beaded ice-cream product does not melt and therefore loose its beaded appearance and consistency.

Figure 5:
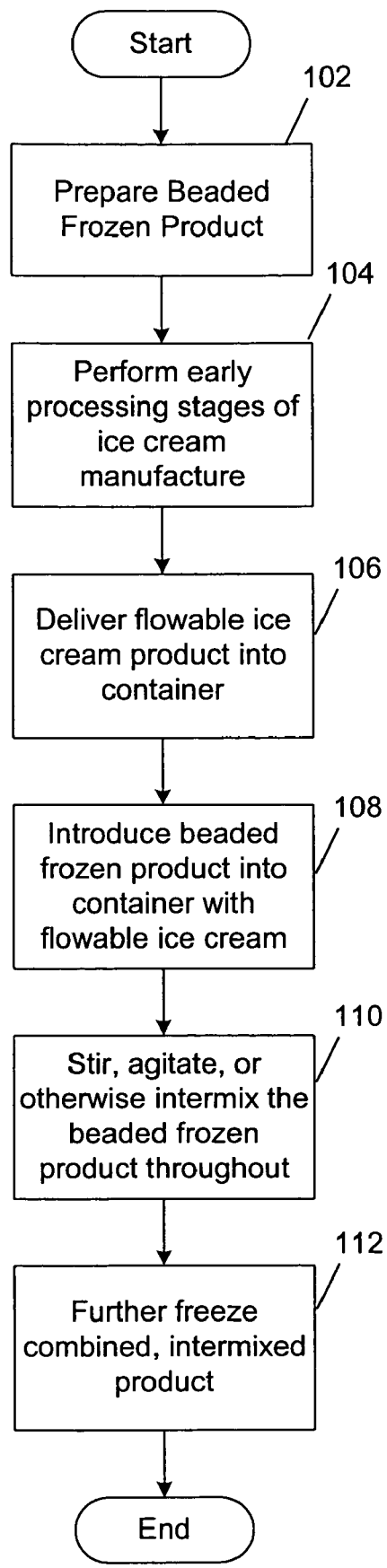
FIG. 5 is a flowchart illustrating certain steps in the process of manufacturing a novelty ice-cream product in accordance with one embodiment of the invention.

Reference is briefly made to FIG. 5, which is a flowchart that illustrates certain fundamental method steps of the above-described embodiment. As illustrated in FIG. 5, the basic steps to one embodiment of this method include preparing a beaded frozen product (as per any of the previously-referenced patents assigned to Dippin' Dots, inc.) (step 102). Generally, this prepared beaded frozen product will be stored at a sufficiently low storage temperature to preserve its free-flowing, beaded composition. Then, the method performs the early (conventional) processing stages of the manufacture of ice cream (step 104). As is known, in the normal manufacture of such ice-cream product, the ice cream is introduced into a container while in a soft or flowable form (step 106). While in this form, the beaded frozen product is introduced into the ice cream (step 108). Then, the combined product is preferably agitated or stirred to substantially intermix the combined product (step 110). Finally, the combined/intermixed product is further frozen, to solidify the ice cream around the frozen beads (step 112), resulting in a product similar to that illustrated in FIG. 1.

Figure 6:
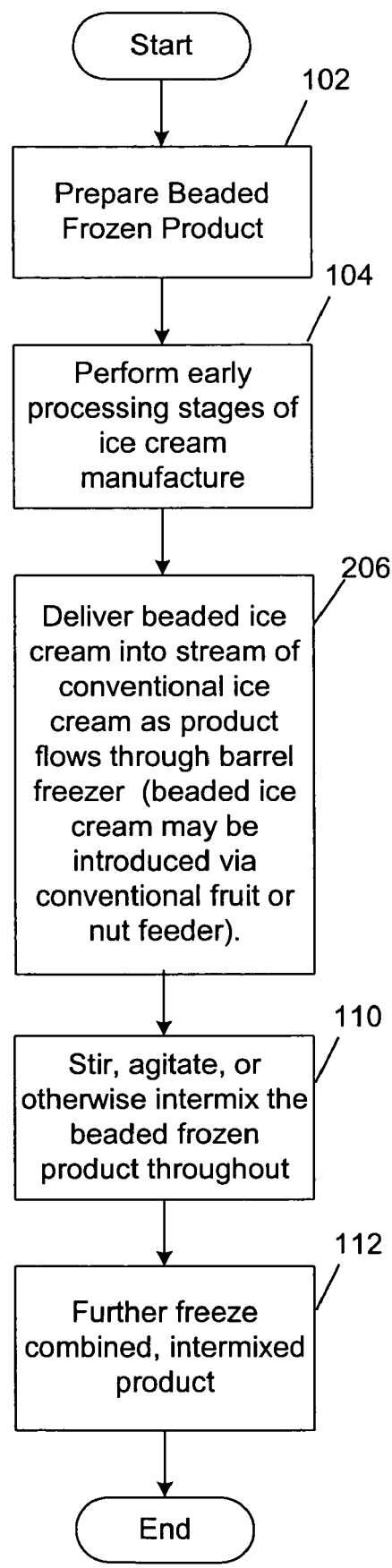
FIG. 6 is a flowchart similar to FIG. 5, but illustrating a slightly alternative embodiment.

FIG. 6 is a flowchart similar to FIG. 5, but illustrating a slightly different embodiment. In the embodiment of FIG. 6, the beaded product may be introduced into the conventional/flowable ice cream through the barrel freezer portion, using a mechanism such as the mechanism used to introduce fruit or nut pieces into conventional ice cream (step 206).

Figure 7:
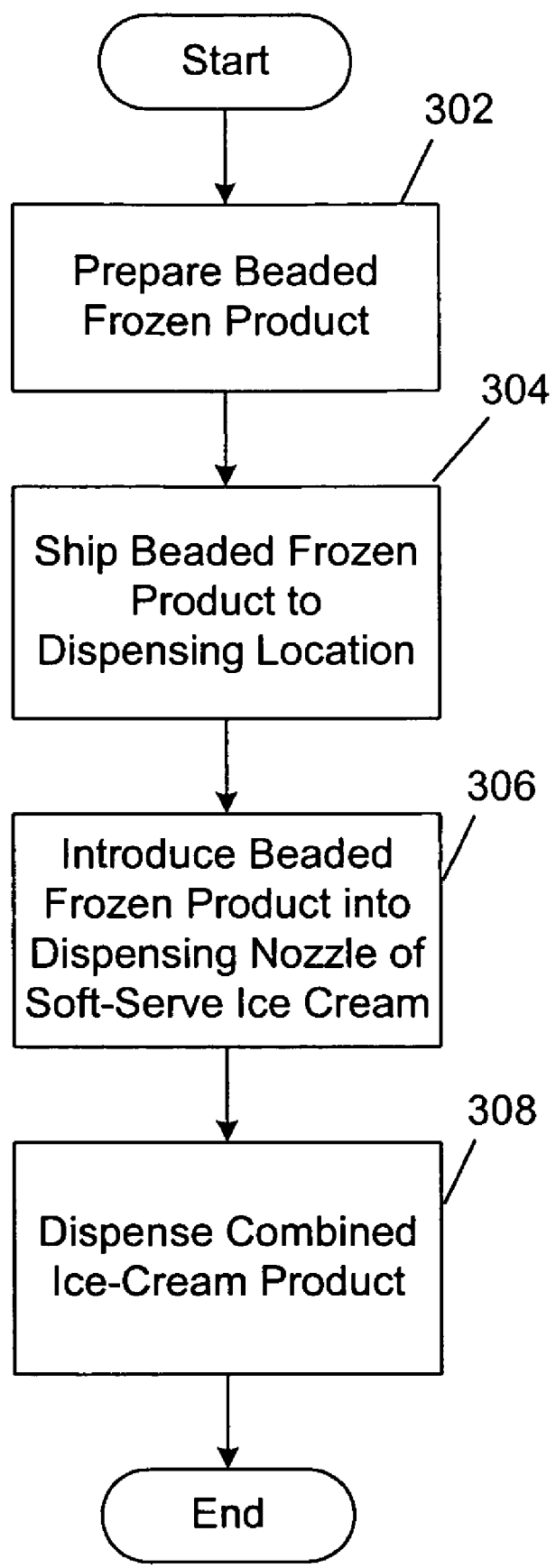
FIG. 7 is a flowchart illustrating certain steps in the process of providing a novelty, soft-serve ice cream produce in accordance with one embodiment of the invention.

Reference is now made to FIG. 7, which is a flowchart illustrating the top-level steps in a process for dispensing an ice-cream product using an apparatus similar to that of FIG. 3. In this embodiment, a beaded frozen product is prepared (step 302) and then shipped to a dispensing location (step 304). Thereafter, the beaded frozen product is introduced into a soft-serve ice cream at a dispensing nozzle (step 306). Finally, the intermixed ice-cream product is dispensed from a dispensing nozzle of the apparatus (step 308).

Figure 8:
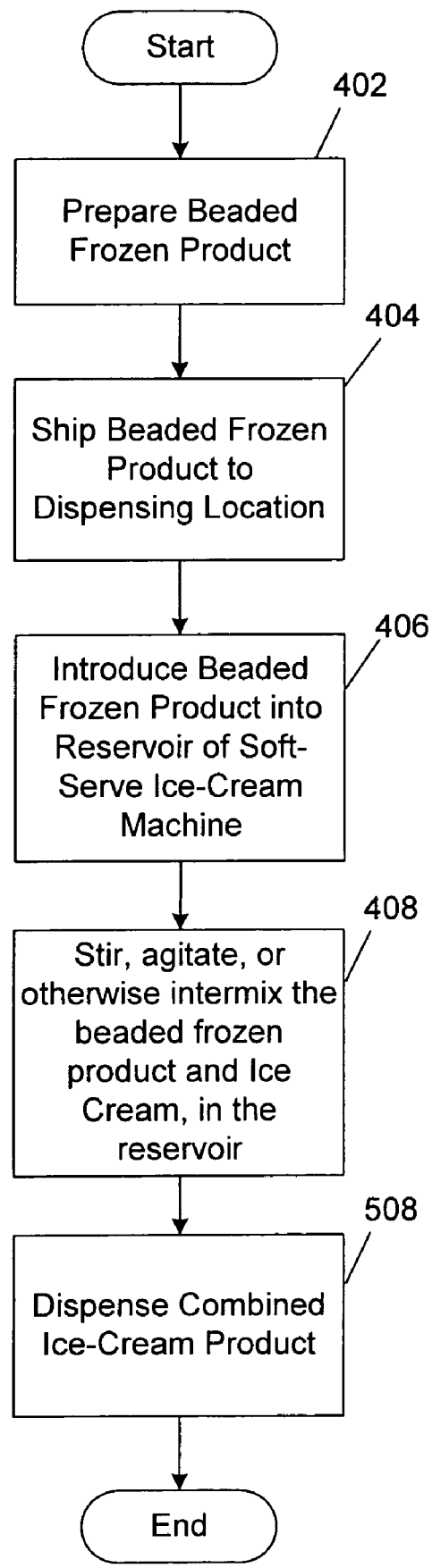
FIG. 8 is a flowchart illustrating certain steps in the process of providing a novelty, soft-serve ice cream produce in accordance with another embodiment of the invention.

Finally, reference is made to FIG. 8, which is a flowchart illustrating the top-level steps in a process for dispensing an ice-cream product using an apparatus similar to that of FIG. 4. In this embodiment, a beaded frozen product is prepared (step 402) and then shipped to a dispensing location (step 404). Thereafter, the beaded frozen product is introduced into a reservoir containing a soft-serve ice cream (step 406). Next, the product is intermixed in the reservoir (step 408). Finally, the intermixed ice-cream product is dispensed from a dispensing nozzle of the apparatus (step 508).

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

The invention claimed is:

1. A method for manufacturing a novelty beaded frozen product and ice cream mixture comprising:
   producing a beaded frozen product using a flash-freezing cryogenic manufacturing process, wherein the flash-freezing cryogenic manufacturing process includes preparing an alimentary composition for freezing, dripping said alimentary composition into a freezing chamber, and freezing said alimentary composition into a beaded frozen product through exposure to a cryogenic refrigerant;
   storing a plurality of the beaded frozen product in a bead reservoir;
   maintaining the bead reservoir at a temperature sufficiently low to allow the beaded frozen product to remain free-flowing;
   configuring a soft-serve auger to deliver soft-serve ice cream in predetermined quantities;
   storing a plurality of soft-serve ice cream in a soft-serve reservoir;
   flowing the ice-cream from the soft-serve ice cream reservoir through the soft-serve auger;
   configuring a bead injection nozzle to work in conjunction with and be physically joined to the soft-serve auger;
   introducing the beaded frozen into the soft-serve ice cream at the soft-serve ice cream auger through the bead injection nozzle while the soft-serve ice cream is still in a flowable state;
   intermixing the beaded frozen with the soft-serve ice cream via the rotating action of the auger; and then
   freezing the intermixed beaded frozen and soft-serve ice cream in a manner that preserves the beaded composition of the beaded frozen product.

2. The method of claim 1, further including filling a product container with the mixture of intermixed beaded frozen product and soft-serve ice cream.

3. The method of claim 1, wherein the intermixing is performed within a product container.

4. The method of claim 1, wherein introducing of the beaded frozen product into the ice cream is performed by introducing the beaded frozen product through a fruit or nut feeder.

5. A method for manufacturing a novelty beaded frozen product and ice cream mixture comprising:
   producing a beaded frozen product using a flash-freezing cryogenic manufacturing process, wherein the flash-freezing cryogenic manufacturing process includes preparing an alimentary composition for freezing, dripping said alimentary composition into a freezing chamber, and freezing said alimentary composition into a beaded frozen product through exposure to a cryogenic refrigerant;
   storing a plurality of the beaded frozen product in a bead reservoir;
   maintaining the bead reservoir at a temperature sufficiently low to allow the beaded frozen product to remain free-flowing;
   configuring a soft-serve auger to deliver soft-serve ice cream in predetermined quantities;
   storing a plurality of soft-serve ice cream in a soft-serve reservoir;
   flowing the ice-cream through the soft-serve auger;
   configuring a bead injection nozzle to work in conjunction with and be physically near the soft-serve auger;
   intermixing the beaded frozen product through the bead injection nozzle with the soft-serve ice cream, at a point adjoining the soft-serve auger, via rotating action of the auger while the soft-serve is still in a flowable state; and then
   freezing the intermixed beaded frozen product and soft-serve ice cream in a manner that preserves the beaded composition of the beaded frozen product.

6. A method for manufacturing a novelty beaded frozen product and ice cream mixture comprising:
   producing a beaded frozen product using a flash-freezing cryogenic manufacturing process, wherein the flash-freezing cryogenic manufacturing process includes preparing an alimentary composition for freezing, dripping said alimentary composition into a freezing chamber, and freezing said alimentary composition into a beaded frozen product through exposure to a cryogenic refrigerant;
   storing a plurality of the beaded frozen product in a bead reservoir having a bead injection nozzle;
   maintaining the bead reservoir at a temperature sufficiently low to allow the beaded frozen product to remain free-flowing;
   configuring a soft-serve auger to deliver soft-serve ice cream in predetermined quantities;
   storing a plurality of soft-serve ice cream in a soft-serve reservoir;
   flowing the ice-cream through the soft-serve auger;
   introducing the beaded frozen product into a combination reservoir through the bead injection nozzle while simultaneously introducing the soft-serve ice cream while still in a flowable state, into said reservoir;
   intermixing the beaded frozen product with the soft-serve via ice cream rotating action of the auger; and then
   freezing the intermixed beaded frozen product and soft-serve ice cream in a manner that preserves the beaded composition of the beaded frozen product.

* * * * *